(No Model.)

J. MOSELEY & B. BLUNDSTONE.
PNEUMATIC TIRE.

No. 462,013. Patented Oct. 27, 1891.

Witnesses
Geo. Snyder.
C. S. Sturtevant

Inventors
Joseph Moseley and
Benjamin Blundstone
By Geo. T. Whitney
atty.

United States Patent Office.

JOSEPH MOSELEY AND BENJAMIN BLUNDSTONE, OF MANCHESTER, ENGLAND.

PNEUMATIC TIRE.

SPECIFICATION forming part of Letters Patent No. 462,013, dated October 27, 1891.

Application filed November 3, 1890. Serial No. 370,174. (No model.) Patented in England October 3, 1890, No. 15,647.

*To all whom it may concern:*

Be it known that we, JOSEPH MOSELEY and BENJAMIN BLUNDSTONE, citizens of the United Kingdom of Great Britain and Ireland, and residents of Manchester, in the county of Lancaster, England, have invented certain new and useful Improvements in Pneumatic and Air-Cushioned Tires, of which the following is a specification.

This invention relates to the valves through which air or other fluid is forced or admitted to the interior of pneumatic and other air-cushioned tires; and it has for its object to permit the pressure within the tire to be reduced when desired—as, for example, in the event of an excessive amount of pressure having been accumulated therein.

The tires to which the improvements secondarily relate are generally distended with air under pressure, and this pressure is commonly obtained by injecting air or water into the tire through a non-return valve until the desired pressure has been reached.

In carrying out our invention we employ any suitable non-return valve, upon which we form or secure a collar curved to the internal curvature of the tire. Outside the tire we form or secure an externally-screwed tube communicating with the non-return valve, and this tube may also be internally screwed to fit the nozzle of the air or fluid injection apparatus. In the center of the inner periphery of the tire there is formed a hole for the passage of the valve, and in the rim of the wheel a corresponding hole is also formed for the same purpose. The valve having been inserted with its collar within the tire and with the screwed tube or stem passing through the holes in the tire and rim, a screwed nut is run down the tube against the rim and a perfectly-tight joint is made. The screwed tube may be protected by means of a plug or cap to prevent the admission of dust, mud, or water. In the event of an excessive pressure within the tire it is necessary only to slightly loosen the nut, whereupon, the compression of the tire around the hole being released, the air will escape through the hole around the screwed tube until the desired reduction or pressure has been reached, when the nut may be re-tightened.

The accompanying drawings illustrate in what manner these improvements may be carried into practical effect, and are hereinafter referred to.

Figure 1:
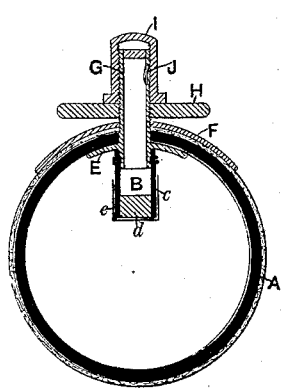
Figure 2:
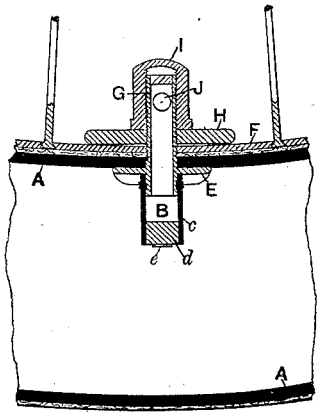
Figure 3:
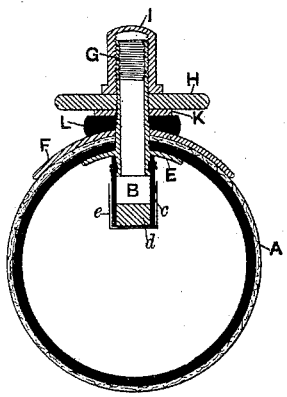

Figure 1 is a cross-section of a pneumatic tire and a part of a wheel having our improved valve applied thereto. Fig. 2 is a partial transverse section of the parts represented in Fig. 1, and Fig. 3 is a modification of the construction represented by Figs. 1 and 2.

In each of the figures in which similar parts are shown they are denoted by similar letters of reference.

A is the pneumatic or air-cushioned tire, which may be of any suitable construction, and which in the drawings is represented as being composed of india-rubber compound (indicated in solid black) with a surrounding of textile fabric.

B is the non-return valve, the form shown in the drawings being that at present commonly used in such tires. It consists of a short length of india-rubber tube $c$ and a plug $d$, held therein, as shown, by a strap $e$, cemented to the rubber tube. When air or fluid is forced through the valve, the elastic rubber is lifted by its pressure from contact with the plug and the air passes into the interior of the tire. After the injection has ceased the internal pressure in the tire presses the rubber tube closely upon the plug and renders the escape of the air impossible.

E is the collar, which has a short nozzle on its under side, to which the upper part of the tube on the non-return valve is bound or secured by cement or other suitable means.

F is the rim of the wheel.

G is the tube or hollow stem opening through the collar E into the non-return valve B. The outer surface of the tube or stem G is screwed and fitted with a nut H, which may have milled edges to enable it to be turned readily by the fingers.

I is an internally-screwed cap fitted upon the screwed tube G in such a manner that it may be screwed down upon the collar E and act as a lock-nut. It also serves to prevent the access of dust to the valve.

J is a hole in the screwed tube G, through which the air or liquid is forced through the valve into the tire. In this case the top of the screwed tube is plugged, as shown in Figs. 1 and 2.

The construction and arrangement shown in Fig. 3 are the same as that shown by Figs. 1 and 2, except that a metallic washer K and a rubber washer L are arranged below the nut H and between it and the wheel-rim, and that the interior of the screwed tube G is screwed for the reception of the nozzle of the fluid-supply apparatus. It will be understood that the washers K L may be employed with the construction shown in Figs. 1 and 2, and that they may be omitted in that shown in Fig. 3.

The non-return valve, if of suitable construction, may be arranged outside the tire instead of inside, as shown in the drawings.

We are aware that it is not new, broadly, to pass a tube through the interior of a pneumatic tire, form a collar upon the inside of the tire integral with the tube, and provide a clamping-nut on the tube outside the tire, and a stop-cock screwed to the top of the tube, and we do not broadly claim such as our invention, our invention being restricted to certain details of construction and arrangements of parts.

Having now particularly described and ascertained the nature of our said invention and in what manner the same is to be performed, we declare that what we claim is—

In a pneumatic or air-cushioned tire, a screwed tube, as G, passing into the interior thereof, a collar E upon the lower portion of said screwed tube, a suitable non-return valve attached to the lower end of said tube, a nut upon the tube upon the exterior of the tire, a washer, as L, and a closed screw-cap I, fitting upon the upper end of the tube and acting to prevent the access of dirt to the screwed tube, and adapted to jam against the nut H, substantially as described.

In testimony that we claim the foregoing as our invention we have signed our names, in presence of two witnesses, this 7th day of October, 1890.

JOSEPH MOSELEY.
BENJAMIN BLUNDSTONE.

Witnesses:
WILLIAM LEESON,
GEO. HEYS.